(12) United States Patent
Chen et al.

(10) Patent No.: US 9,825,747 B2
(45) Date of Patent: Nov. 21, 2017

(54) EFFICIENT UPLINK RESOURCE INDICATION FOR CSI FEEDBACK

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 543 days.

(21) Appl. No.: 14/148,471

(22) Filed: Jan. 6, 2014

(65) Prior Publication Data

US 2014/0204856 A1 Jul. 24, 2014

Related U.S. Application Data

(60) Provisional application No. 61/755,814, filed on Jan. 23, 2013.

(51) Int. Cl.
| | | |
|---|---|---|
| *H04L 5/00* | (2006.01) | |
| *H04B 7/06* | (2006.01) | |
| *H04W 72/02* | (2009.01) | |
| *H04W 72/04* | (2009.01) | |

(52) U.S. Cl.
CPC ......... *H04L 5/0057* (2013.01); *H04B 7/0632* (2013.01); *H04L 5/0053* (2013.01); *H04W 72/02* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 2012/0120817 | A1* | 5/2012 | Khoshnevis | H04L 1/0026 370/252 |
| 2012/0188976 | A1* | 7/2012 | Kim | H04L 1/0025 370/329 |
| 2012/0314685 | A1* | 12/2012 | Chen | H04L 5/0057 370/329 |
| 2013/0021980 | A1* | 1/2013 | Yang | H04B 7/0626 370/328 |

(Continued)

FOREIGN PATENT DOCUMENTS

| | | |
|---|---|---|
| CN | 101663907 A | 3/2010 |
| CN | 102307083 A | 1/2012 |

(Continued)

OTHER PUBLICATIONS

U.S. Appl. No. 61/649,828, transmission mode and feedback designs to support MTC type devices in LTE, May 21, 2012.*

(Continued)

*Primary Examiner* — Christopher Crutchfield
*Assistant Examiner* — Thinh Tran
(74) *Attorney, Agent, or Firm* — Norton Rose Fulbright US LLP

(57) ABSTRACT

Channel state information (CSI) feedback reporting is disclosed for multi-cell downlink cooperation networks. In such networks, when a user equipment (UE) has little uplink data traffic, CSI feedback is triggered by the serving base station through a downlink grant to the UE. The UE detects the CSI feedback trigger placed by the base station in the downlink grant and selects a set of uplink resources based, at least in part, on the downlink grant.

29 Claims, 5 Drawing Sheets

(56) References Cited

U.S. PATENT DOCUMENTS

| | | | | |
|---|---|---|---|---|
| 2013/0308572 A1* | 11/2013 | Sayana | ............... | H04W 72/048 |
| | | | | 370/329 |
| 2013/0322393 A1* | 12/2013 | Kishiyama | ............ | H04L 5/0057 |
| | | | | 370/329 |
| 2014/0010126 A1* | 1/2014 | Sayana | ................ | H04J 3/1694 |
| | | | | 370/280 |

FOREIGN PATENT DOCUMENTS

| | | |
|---|---|---|
| CN | 102845097 A | 12/2012 |
| EP | 2555555 A2 | 2/2013 |
| WO | WO-2011010863 A2 | 1/2011 |
| WO | WO-2012096431 A1 | 7/2012 |

OTHER PUBLICATIONS

U.S. Appl. No. 61/668,900, "Methods of CSI Reporting with Multiple CSI configuration", Jul. 2012.*

Huawei et al., "CSI Feedback Modes for CoMP", 3GPP Draft; R1-121946, May 12, 2012 3rd Generation Partnership Project (3GPP), Mobile Competence Centre ; 650, route des Lucioles ; F-06921 Sophia-Antipolis Cedex ; France, vol. RAN WG1, Nr Prague, Czech Republic; May 21, 2012-May 25, 2012, R1-121946, pp. 1-3.

International Search Report and Written Opinion—PCT/US2014/010508—ISA/EPO—Apr. 23, 2014.

* cited by examiner

EFFICIENT UPLINK RESOURCE INDICATION FOR CSI FEEDBACK

CROSS-REFERENCE TO RELATED APPLICATIONS

This application claims the benefit of U.S. Provisional Patent Application No. 61/755,814, entitled, "EFFICIENT UPLINK RESOURCE INDICATION FOR CSI FEEDBACK," filed on Jan. 23, 2013, which is expressly incorporated by reference herein in its entirety.

BACKGROUND

Field

Aspects of the present disclosure relate generally to wireless communication systems, and more particularly, to efficient uplink (UL) resource indication for channel state information (CSI) feedback.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to a method of wireless communication that includes receiving a downlink grant at a mobile device, detecting, by the mobile device, a CSI trigger in the downlink grant, and transmitting CSI feedback by the mobile device in response to the CSI trigger.

Additional aspects of the present disclosure are directed to a method of wireless communication that includes detecting, at a base station, downlink cooperation to a mobile device from a plurality of cells, adding a CSI trigger to a downlink grant generated by the base station for the mobile device, and transmitting the downlink grant to the mobile device.

Further aspects of the present disclosure are directed to an apparatus configured for wireless communication that includes means for receiving a downlink grant at a mobile device, means for detecting, by the mobile device, a CSI trigger in the downlink grant, and means for transmitting CSI feedback by the mobile device in response to the CSI trigger.

Further aspects of the present disclosure are directed to an apparatus configured for wireless communication that includes means for detecting, at a base station, downlink cooperation to a mobile device from a plurality of cells, means for adding a CSI trigger to a downlink grant generated by the base station for the mobile device, and means for transmitting the downlink grant to the mobile device.

Further aspects of the present disclosure are directed to a computer program product having a non-transitory computer-readable medium with program code recorded thereon. The program code, when executed by a computer, causes the computer to receive a downlink grant at a mobile device, detect, by the mobile device, a CSI trigger in the downlink grant, and transmit CSI feedback by the mobile device in response to the CSI trigger.

Further aspects of the present disclosure are directed to a computer program product having a non-transitory computer-readable medium with program code recorded thereon. The program code, when executed by a computer, causes the computer to detect, at a base station, downlink cooperation to a mobile device from a plurality of cells, add a CSI trigger to a downlink grant generated by the base station for the mobile device, and transmit the downlink grant to the mobile device.

Further aspects of the present disclosure are directed to an apparatus configured for wireless communication. The apparatus includes at least one processor and a memory coupled to the processor. The processor is configured to receive a downlink grant at a mobile device detect, by the mobile device, a CSI trigger in the downlink grant, and transmit CSI feedback by the mobile device in response to the CSI trigger.

Further aspects of the present disclosure are directed to an apparatus configured for wireless communication. The apparatus includes at least one processor and a memory coupled to the processor. The processor is configured to detect, at a base station, downlink cooperation to a mobile device from a plurality of cells, add a CSI trigger to a downlink grant generated by the base station for the mobile device, and transmit the downlink grant to the mobile device.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
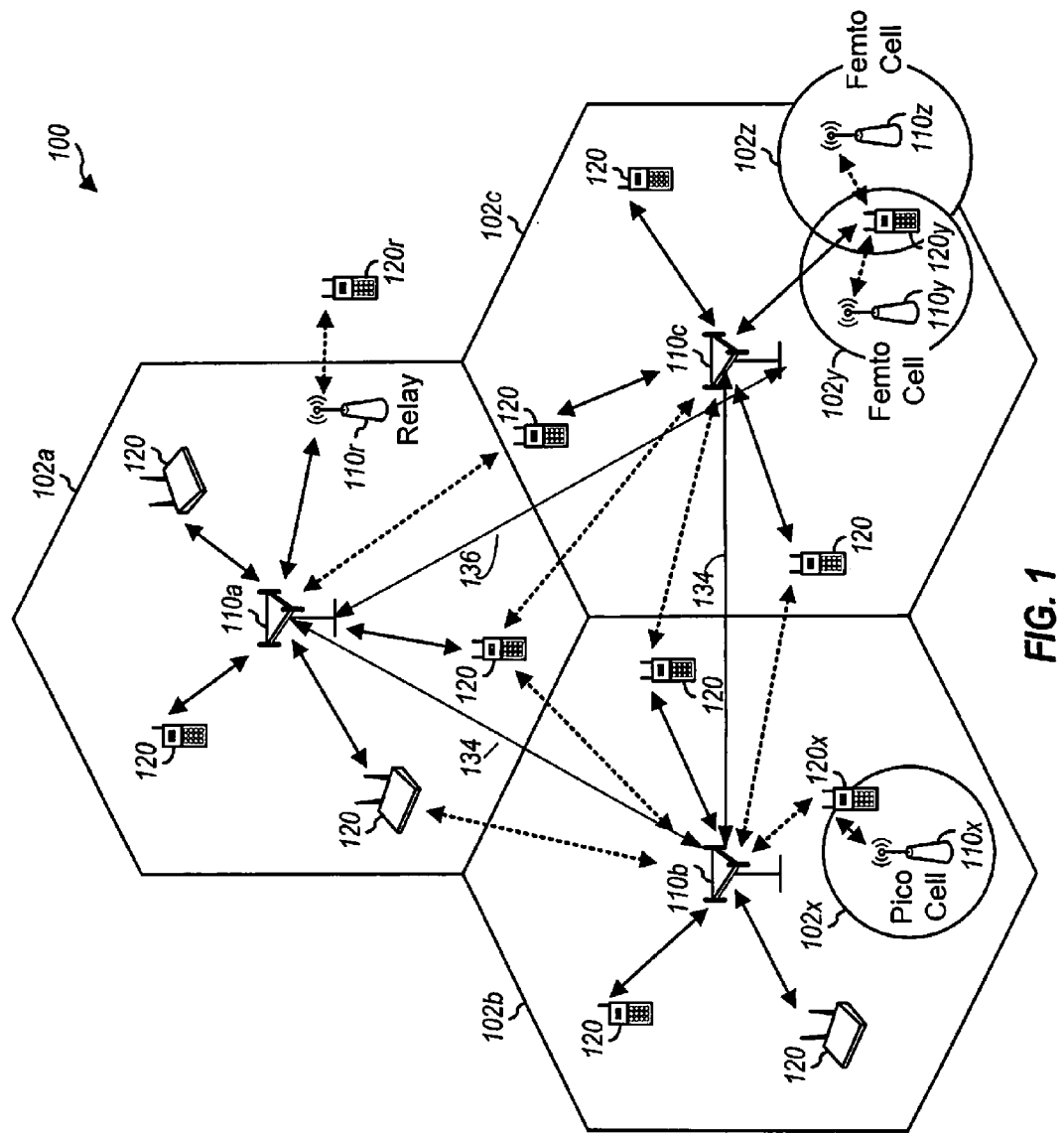
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, 12, or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 2:
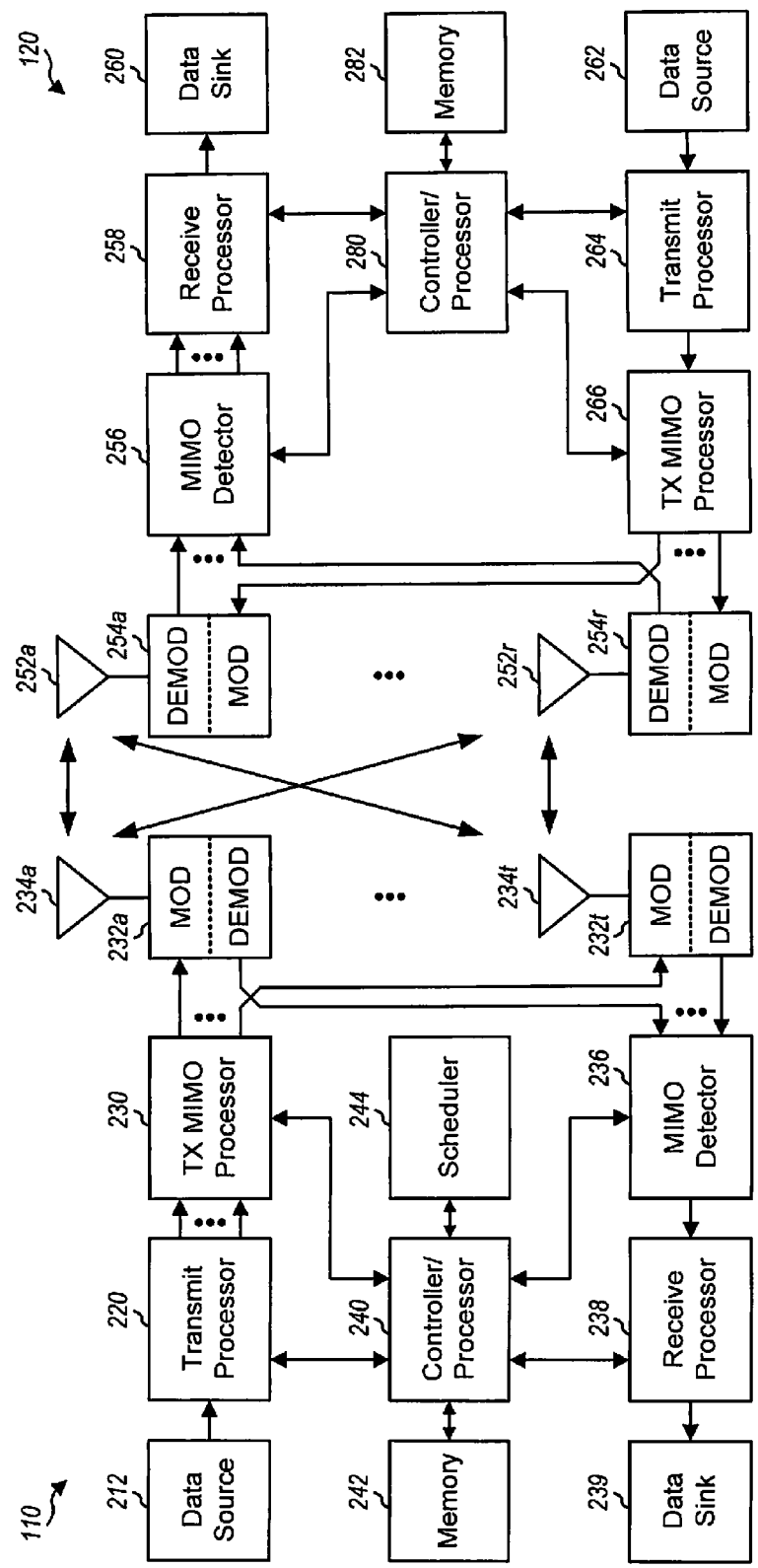
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the demodulator/modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 7 and 8, and/or other processes for the techniques described herein. The memories 242 and 282 may store data and program codes for the eNB 110 and the UE 120, respectively. A scheduler 244 may schedule UEs for data transmission on the downlink and/or uplink.

Carrier Aggregation

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 3A:
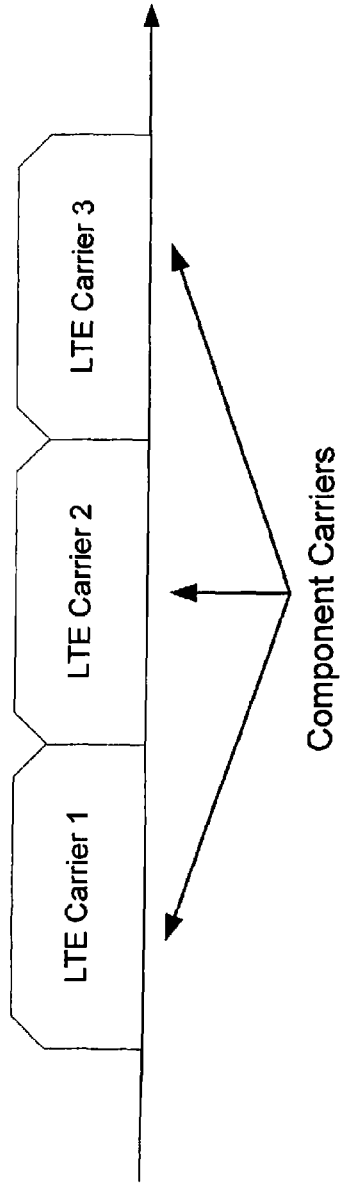
FIG. 3A is a block diagram illustrating a continuous carrier aggregation type.
Figure 3B:
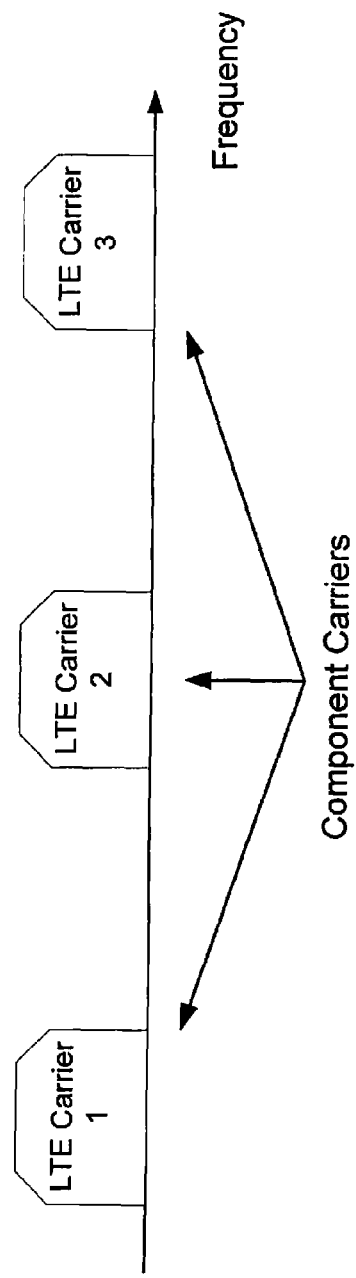
FIG. 3B is a block diagram illustrating a non-continuous carrier aggregation type.

For the LTE-Advanced mobile systems, two types of carrier aggregation (CA) methods have been proposed, continuous carrier aggregation and non-continuous carrier aggregation. They are illustrated in FIGS. 3A and 3B. Non-continuous carrier aggregation occurs when multiple available component carriers are separated along the frequency band (FIG. 3B). On the other hand, continuous carrier aggregation occurs when multiple available component carriers are adjacent to each other (FIG. 3A). Both non-continuous and continuous carrier aggregation aggregate multiple LTE/component carriers to serve a single unit of LTE Advanced UE.

Multiple RF receiving units and multiple FFTs may be deployed with non-continuous carrier aggregation in LTE-Advanced UE since the carriers are separated along the frequency band. Because non-continuous carrier aggregation supports data transmissions over multiple separated carriers across a large frequency range, propagation path loss, Doppler shift and other radio channel characteristics may vary a lot at different frequency bands.

Thus, to support broadband data transmission under the non-continuous carrier aggregation approach, methods may be used to adaptively adjust coding, modulation and transmission power for different component carriers. For example, in an LTE-Advanced system where the evolved NodeB (eNB) has fixed transmitting power on each component carrier, the effective coverage or supportable modulation and coding of each component carrier may be different.

CSI Feedback in Carrier Aggregation

In LTE-A, a UE can be configured with multiple component carriers (CCs). One component carrier is designated as primary component carrier (PCC), while others are referred to as secondary component carriers (SCCs). The PCC is typically semi-statically configured by higher layers on a per UE basis. ACK/NAKs, channel quality indicators (CQIs), scheduling requests (SRs), and the like, when transmitted on PUCCH, are carried on the PCC and not the SCC, for a given UE. In configurations of LTE carrier aggregation, carrier aggregation allocations may support up to a 5:1 downlink-to-uplink component carrier mapping. Therefore, one uplink component carrier may support CSI feedback on PUCCH for up to five downlink component carriers.

LTE carrier aggregation allocation also supports channel state information (CSI) feedback, such as both periodic and aperiodic CQI, precoding matrix indicator (PMI), and rank indictor (RI) reporting. Periodic CQI/PMI/RI is generally reported for only one downlink component carrier in one subframe. The particular downlink component carrier, for which such reports are made, is determined according to a reporting priority scheme. For example, downlink component carriers may be prioritized based on the configured reporting type, e.g., 1st (=Top) priority may be related to reporting types 3, 5, 6, 2a; 2nd priority may be related to reporting types 2, 2b, 2c, 4; and 3rd priority may be related to reporting types 1, 1a. Where multiple downlink component carriers have the same reporting mode/type, prioritization may be RRC-configured between the component carriers. For example, component carriers are generally provided a component carrier index within the carrier aggregation. The RRC-configured priority may give the highest priority of the component carriers having the same reporting mode/type to the component carrier with the lowest component carrier index. The same priority rule may apply to both cases without PUSCH and cases with PUSCH. Once the downlink component carrier is identified for reporting, the CQI/PMI/RI for the other downlink component carriers may be dropped. It should further be noted that collision between the various CSI types, such as RI, wideband CQI/PMI, and subband CQI for the same component carrier may be resolved according to existing procedures.

When carrier aggregation is configured, the aperiodic CSI request field in the UE-specific search space contains two bits: "00" state in the CSI request field indicates no CSI is triggered; "01" state in the CSI request field indicates trigger for the downlink component carrier that is SIB2-linked to the uplink component carrier transmitting the CSI report; "10" and "11" states in the CSI request field indicates that the CSI is configured by RRC. For the one-bit in the common search space: "0" state indicates no CSI is triggered, while "1" state means that CSI is configured by RRC. The RRC may configure any combination of up to five component carriers. Currently, aperiodic CSI are transmitted using PUSCH, which are scheduled via uplink grant. Thus, currently aperiodic CSI requests are only present in uplink grants.

CSI Feedback in Coordinate Multipoint Transmission

In Rel-11, coordinated multipoint (CoMP) transmission schemes are supported CoMP transmission refers to schemes where multiple base stations coordinate transmissions to (downlink CoMP) or receptions from (uplink CoMP) one or more UEs. Downlink CoMP and uplink CoMP can be separately or jointed enabled for a UE. Some examples of CoMP schemes are: (1) Joint transmission (downlink CoMP), where multiple eNBs transmit the same data meant for a UE; (2) Joint reception (uplink CoMP), where multiple eNBs receive the same data meant for a UE; (3) Coordinated beamforming, in which an eNB transmits to its UE using beams that are selected to reduce interference to UEs in neighboring cells; (4) Dynamic point(s) selection, in which the cell(s) involved in data transmissions may change from subframe to subframe. CoMP may exist in both homogeneous networks and/or heterogeneous networks (HetNet). The connection between the nodes involved in CoMP occurs through the X2 interface, which experiences some latency and limited bandwidth, or through a fiber-optic interface, which experiences minimum latency and, essentially, "unlimited" bandwidth. HetNet CoMP may involve coordination among both higher-powered eNBs and lower-powered nodes, sometimes also referred to as remote radio heads (RRHs).

To more efficiently support CoMP operations, one or more CSI processes may be configured for a UE. Because more than one cell is participating in communication with the UE, more CSI processes may be used corresponding to the additional cells. For example, an eNB may associate each CSI process with a particular cell involved in CoMP operation for the UE. Each CSI process is associated with a reference signal for channel estimation and an interference measurement resource for interference estimation for CSI feedback. Similar to carrier aggregation implementations, a UE may be triggered to report CSI for one or more CSI processes in a single subframe. There are two bits available for RRC configuration of CSI feedback for UE in a CoMP operation. A UE in a CoMP operation may also be allocated for carrier aggregation. Thus, an instance could arise in which a UE may report multiple CSI processes for different component carriers for the different cells in the CoMP operation.

Assignment of Uplink Resources for Large CSI Feedback

Figure 4:
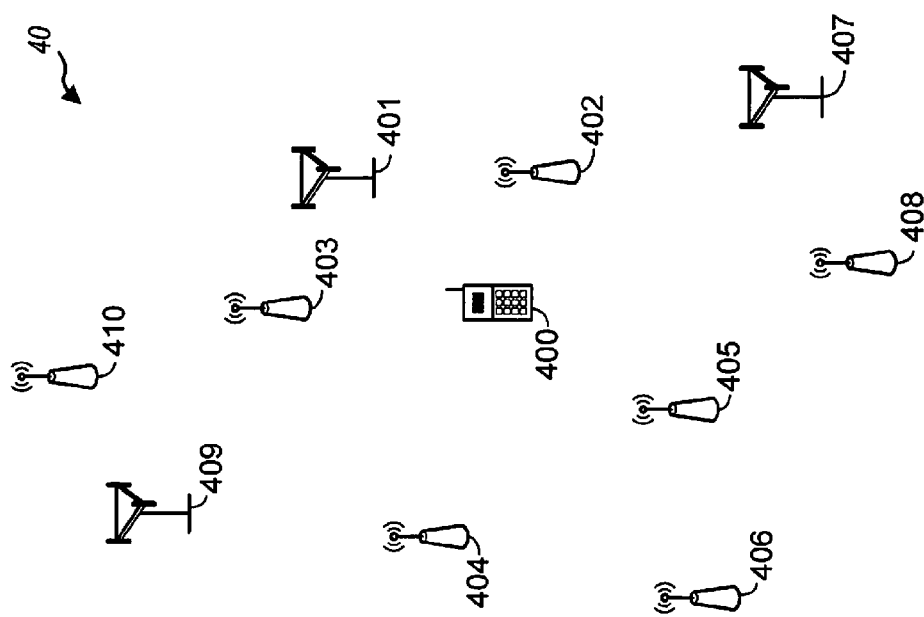
FIG. 4 is a block diagram illustrating a wireless network configured for cloud RAN operation.

In the future evolution of LTE systems, a larger number of cells may be involved for a given UE in order to fully exploit downlink cooperation among transmission points, with extensive cooperation and coordination among the cells using a high bandwidth and/or low latency backhaul interface, such as fiber. This system of such a large number of cooperative and coordinating cells is often referred to as "cloud RAN." Current CoMP systems generally provide for cooperation a few separate cells (e.g., 3 cells). The cloud RAN systems contemplate many more cells cooperating in the transmission per UE. FIG. 4 is a block diagram illustrating a wireless network 40 configured for cloud RAN operation. In wireless network 40, a UE 400 may be served through a primary base station 401. Operating in a cloud RAN configuration, downlink cooperation for data directed to UE 400 may include cooperation among base station 401 along with base stations 402-410. Base stations 401, 407, and 409 may be configured as higher-powered base stations, while base stations 402-406, 408, and 410 may be lower-powered base stations or RRHs. Each of base stations 402-410 may transmit downlink data or cooperate for interference coordination or cancellation by coordinating over a fiber backhaul interface between base stations 401-410. Extensive CSI feedback would be integral to support such cloud RAN operations, resulting in a large amount of uplink overhead from UE 400. UE 400 may provide CSI measurement for channels with each of base stations 401-410, potentially including channels having very low signal to noise ratio. One issue that arises with such large uplink overhead is how to efficiently assign uplink resources for a very large amount of CSI feedback from UE 400. The amount of CSI overhead information may change (e.g., different granularity, different types report, etc.) over different subframes depending on UE channel conditions, traffic needs, the number of cooperating cells, cell loads, and the like. Thus, the need for CSI feedback can be bursty at the same time that there may be little need for uplink data scheduling. As aperiodic CSI are scheduled through uplink grants, with less need for uplink data scheduling than need for CSI feedback, an issue arises as to where the additional CSI feedback may be scheduled.

Based on existing processes and procedures, several options may be available for such cloud RAN support. For example, a periodic uplink control channel (e.g., PUCCH) may be configured to handle the additional CSI feedback. However, control channel capacity is typically limited, and may not accommodate a large amount of CSI feedback. Another possible solution may configure a periodic uplink data channel (e.g., PUSCH). However, a periodic data channel may consume too much overhead and may not be efficient in addressing the need for bursty type of downlink traffic.

Another possible solution may utilize a semi-persistent scheduling (SPS) approach, similar to an uplink data channel. For example, an uplink data channel may be activated for a specific duration of time and, when it is no longer needed, it can be deactivated. This SPS approach may provide a good compromise and is more efficient than simply configuring a periodic uplink data channel. However, SPS periodicity is typically no less than 10 ms. This length of periodicity would not be efficient in addressing the potential need for subframe-dependent PUSCH resource sizes. The SPS approach may also be inefficient in terms of handling burstiness and uplink overhead.

Another possible approach may utilize an uplink grant-triggered aperiodic CSI feedback. Such an uplink grant-triggered aperiodic CSI feedback may provide a valid option. However, as there may be little need for uplink data scheduling, this approach could be wasteful in downlink overhead because the triggering would need to be present in an uplink grant. Thus, potential solutions based on existing technologies offer limited options and limited efficiencies.

Various aspects of the present disclosure are directed to downlink grant-triggered CSI transmission. Currently, there is no scheduling information for uplink transmissions in the downlink grant. The various aspects of the present disclosure provide one or more bits in the downlink grant that may be used to trigger the CSI transmissions. The one or more bits may be new bits, re-interpretation of existing bits, or a combination thereof. The triggered uplink transmission of CSI feedback can be a CSI-only transmission, or may, alternatively, contain UL-SCH, as well, for carrying uplink data from the UE. The uplink channel carrying the CSI may be a PUCCH channel or a PUSCH channel, while the CSI reported may take the same mode as those defined for periodic CSI or aperiodic CSI, or a combination thereof.

Figure 5:
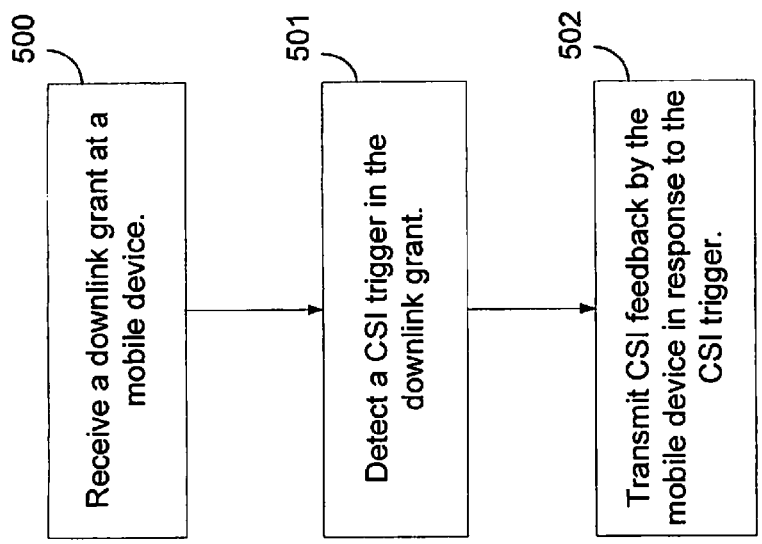
FIG. 5 is a functional block diagram illustrating example blocks executed to implement one aspect of the present disclosure.
Figure 7:
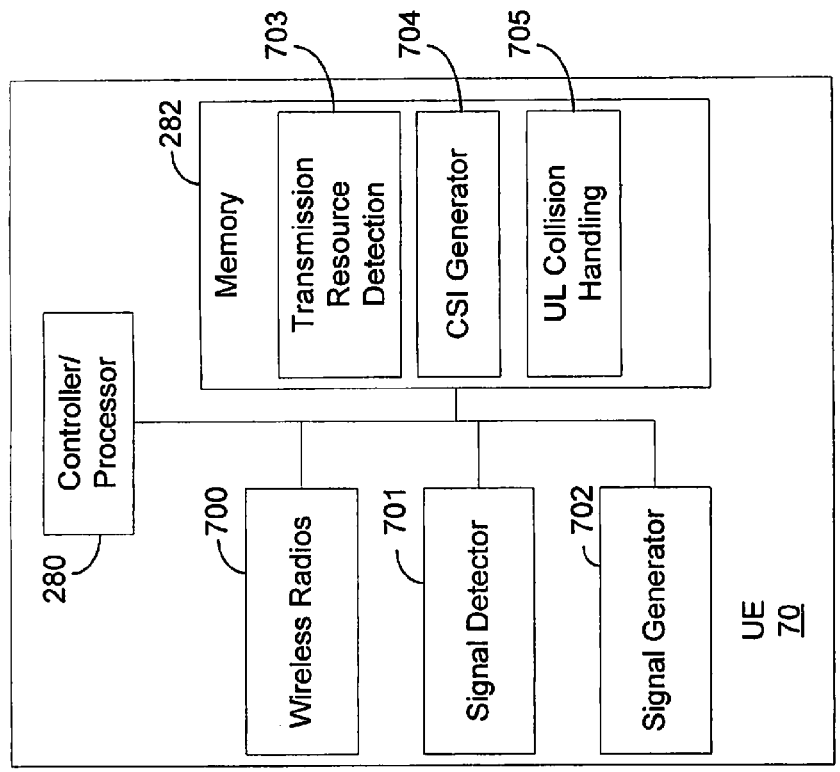
FIG. 7 is a block diagram illustrating a UE configured according to one aspect of the present disclosure.

FIG. 5 is a functional block diagram illustrating example blocks executed to implement one aspect of the present disclosure. At block 500, a mobile device receives a downlink grant from a serving base station. With reference to FIGS. 2 and 7, a mobile device, such as UEs 120 and 70, may operate under control of the controller/processor 280. FIG. 7 is a block diagram illustrating a UE 70 configured according to one aspect of the present disclosure. Controller/processor 280 executes the logic stored in memory 282 and controls the components of UEs 120 and 70 that provide the features and functionality of UEs 120 and 70. For example, wireless radios 700, which may include individual components, such as antennas 252*a-r*, demodulator/modulators 254*a-r*, MIMO detector 256, and receive processor 258, may receive radio frequency signals transmitted over the air interface. The combination of these components and acts may provide means for receiving a downlink grant at a mobile device.

At block 501, the mobile device detects a CSI trigger in the downlink grant. Under control of controller/processor 280, a UE, such as UEs 120 and 70 may detect and decode received signals using signal detector 701 and other individual components, such as demodulator/modulators 254*a-r*, MIMO detector 256, and receive processor 258. By decoding the received signals, such as a downlink grant, UE 120 or 70 may detect, under control of controller/processor 280, a CSI trigger contained within the downlink grant. The combination of these components and acts may provide means for detecting, by the mobile device, a CSI trigger in the downlink grant.

At block 502, the mobile device transmits CSI feedback in response to the CSI trigger. CSI feedback may include various types of feedback such as CQI, PMI, RI, and the like, both in periodic and aperiodic forms. In general, using signal detector 701 and operating logic, such as CSI generator 704, stored in memory 282, and executed by controller processor 280, a UE, such as UEs 120 or 70, may measure the signal qualities, determine precoding or ranking indicators, and the like of the various channels between the UE and any cooperating base stations. The CSI generator 704, under control of controller/processor 280 may then generate the CSI feedback report using signal generator 702 and transmit the CSI feedback to the base station over wireless radios 700. The combination of these components and acts may provide means for transmitting CSI feedback by the mobile device in response to the CSI trigger.

It should be noted that in selected aspects of the present disclosure, when a UE has uplink data traffic that can be scheduled using an uplink grant, the downlink grant-triggered CSI may be disabled, instead scheduling the additional CSI using the typical uplink grant procedure. Additional and/or alternative aspects of the present disclosure may include downlink grant-triggered CSI in all circumstances as well. The aspects of the disclosure are not limited to any one manner for applying the downlink grant triggered CSI.

Figure 6:
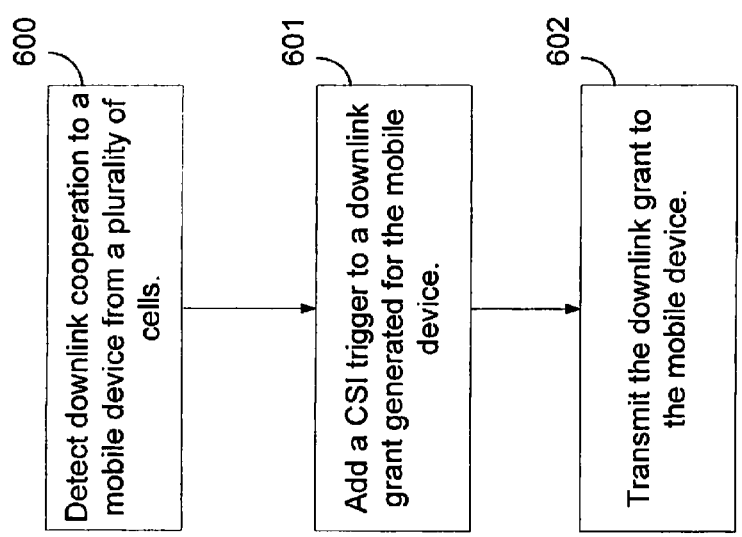
FIG. 6 is a functional block diagram illustrating example blocks executed to implement one aspect of the present disclosure.

FIG. 6 is a functional block diagram illustrating example blocks executed to implement one aspect of the present disclosure. At block 600, a base station detects downlink cooperation to a mobile device from multiple cells. A base station maintains communication with other base stations through a backhaul interface, such as a fiber backhaul interface. With reference to FIG. 2, a base station, such as eNB 110 may maintain communication with multiple base stations of different cells. Through this communication, and under control of controller/processor 240, eNB 110 determines through this communication that multiple cells may be providing downlink cooperation to a particular mobile device. The combination of these components and acts may provide means for detecting downlink cooperation to a mobile device from a plurality of cells.

At block 601, the base station adds a CSI trigger to a downlink grant generated for the mobile device. During scheduling of a downlink grant by a base station, such as UE 110, scheduler 244 operates under control of controller/processor 240 to generate the downlink grant messages to be sent to any particular mobile station. When the downlink cooperation has been detected from multiple cells at block 600, controller/processor 240 and scheduler 244 adds a CSI trigger to the downlink grant. The trigger may use existing bits in the downlink grant that are repurposed for such a CSI trigger. Alternatively, new bits may be defined for a CSI trigger. The combination of these components and acts may provide means for adding a CSI trigger to a downlink grant generated for the mobile device.

At block 602, the base station transmits the downlink grant containing the CSI trigger to the mobile device. For example, eNB 110 may transmit the downlink grant, under control of controller/processor 240, using transmit processor 220, TX MIMO processor 230, modulator/demodulators 232a-t, and antennas 234a-t. The combination of these components and acts may provide means for transmitting the downlink grant to the mobile device.

The resources for the uplink channel carrying CSI may be one or more sets of resources that are configured by higher layers (e.g., RRC). The various aspects of the present disclosure may provide for different ways to select which of the sets of resources to use. The mobile device, such as UE 400, may select a particular set of resources based on the downlink grant from base station 401. For example, the designated bits in the downlink grant from base station 401 can indicate which set of resources to use. The RRC generally has two bits that can be used to schedule three sets of resources. One combination of bits designates that no CSI is requested, while the remaining three combinations can identify three separate sets (e.g., (1) first set uses one RB designated as RB0, (2) second set uses two RBs designated as RB0-RB1, (3) third set uses one PUCCH format 3 under a specific PUCCH format 3 resource). Various combinations may be implemented to define and select the three available sets in RRC configurations.

In an additional aspect, different downlink DCI formats included in the DCI of the downlink grant from base station 401 may trigger selection of different sets of resources. For example, DCI format 1A, which includes one bit, could trigger a first set, while DCI format 2D, which includes two bits, could trigger additional sets, and the like.

In a further aspect, a different control channel type selected by base station 401 for the downlink grant may trigger selection of different sets of resources. For example, a PDCCH control channel could trigger selection of a first set, while an enhanced PDCCH (EPDCCH) control channel could trigger selection of a second set, and the like. In a further aspect, different decoding candidates used by base station 401 in the downlink grant to UE 400 may trigger selection of different sets of resources. For example, a first decoding candidate of an aggregation level could trigger selection of a first set of resources, while a second decoding candidate of the same aggregation level could trigger selection of a second set of resources, and the like. In another example of decoding candidate-triggered selection, decoding candidates of a first aggregation level could trigger selection of a first set of resources, while decoding candidates of a second aggregation level could trigger selection of a second set of resources, and the like. In still a further example of decoding candidate-triggered selection, an EPDCCH control channel may be configured with two resource sets, where decoding candidates of a first EPDCCH resource set could trigger selection of a first set of resources for CSI transmission, while decoding candidates of a second EPDCCH resource set could trigger selection of a second set of resources for CSI transmission, and the like. In still a further example of decoding candidate-triggered selection, a decoding candidate in a common search space could trigger selection of a first set of resources, while a decoding candidate in a UE-specific search space could trigger selection of a second set of resources. Various other parameters or a combination of the foregoing parameters may be used for selection of sets of resources in additional or alternative aspects of the present disclosure.

The sets of resources available for the uplink channel carrying CSI contain various information. For example, each set of resources configured by RRC may contain information identifying the resources to transmit CSI (e.g., location, bandwidth, modulation order, rank, precoding, etc.), information identifying the CSI mode/type, a transport power control (TPC) command for the uplink channel, the cyclic shift for the demodulation reference signal (DM-RS) and orthogonal cover code (OCC) index, and/or a trigger of an aperiodic sounding reference signal (SRS) request.

It should be noted that, instead of a configurable modulation order and rank, both may be fixed, for example, using quadrature phase shift keying (QPSK) and Rank 1 only. When a fixed modulation order and rank are employed, the information identifying the resources may be unnecessary.

In an alternative aspect of the present disclosure, the CSI may be transmitted by the mobile device, such as UE 400, only once. However, in additional aspects of the present disclosure, the CSI may be transmitted by the mobile device, such as UE 400, a particular number times. That number may be predetermined or configurable based on various parameters, such as channel quality, power availability (e.g., battery level), processing load, or the like. Within each such multiple transmissions, the same or different resources may be used. For example, using the various methods or processes described previously for selecting a particular set of resources, each instance of the multiple transmissions, UE 400 may select the set of resources according to the immediate condition at transmission time. Thus, different sets of resources may be used by UE 400 for each instance of CSI transmission. Alternatively, one set of resources may be determined by UE 400 at the initial transmission of the multiple transmissions with the same set of resources used by UE 400 for each subsequent transmission of the multiple transmission. The multiple transmissions may also use the same or different types of aperiodic CSI (A-CSI) feedback in each of the transmission opportunities. For example, when the number of multiple CSI transmissions is determined, UE 400 will transmit only aperiodic CQI (A-CQI) for each transmission instance. In another example aspect, after the number of multiple transmissions is determined, UE 400 transmits a different CSI feedback report each time, e.g., first transmitting RI, then, in the next transmission instance, transmitting wideband CQI/PMI, and then, in the following transmission instance, transmit subband CQI, and the like. UE 400 and the serving base station, such as base station 401, communicate the details of the multiple CSI transmissions including the number of times the CSI will be transmitted, the resources used, type, and the like.

According to various aspects of the present disclosure, in a subframe where UE 400 receives downlink-triggered CSI, and is also scheduled to transmit some other uplink signals (such as periodic CSI, SRS, SR, ACK/NAK, PUSCH, etc.), the downlink-triggered CSI may be multiplexed by UE 400 with the other signals and/or some type of prioritization may be implemented. For example, if downlink-triggered CSI is carried by PUSCH, the multiplexing of other signals including SRS/SR/ACK/NAK can be handled the same way as UE 400 handles SRS/SR/ACK/NAK with a regular PUSCH data channel without UL-SCH data. If other such signals contain periodic CSI (P-CSI), the P-CSI can be dropped. Similarly, if other signals contain another PUSCH, one of the two PUSCHs can be dropped. For example, when a regular PUSCH collides with a PUSCH resulting from a downlink-triggered CSI, UE 400 may drop the PUSCH resulting from the downlink-triggered CSI. In implementations where parallel PUSCH transmission are allowed, UE 400 may transmit both colliding PUSCH. In another example, if downlink-triggered CSI is carried by PUCCH, UE 400 may handle the multiplexing of other signals including SRS/SR/ACK/NAK in the same way as SRS/SR/ACK/NAK/PUSCH are handled with a regular P-CSI That is, if the other signals contain P-CSI, the P-CSI can be dropped.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    when the mobile device does not have uplink data traffic that can be scheduled using an uplink grant, receiving a downlink grant at a mobile device with a channel state information (CSI) trigger;
    detecting, by the mobile device, the CSI trigger in the downlink grant;
    detecting a collision of CSI feedback triggered by the CSI trigger in the downlink grant with other uplink signals scheduled for the mobile device:
    in response to the collision, multiplexing the CSI feedback with the other uplink signals;
    transmitting the CSI feedback by the mobile device in response to the CSI triggering the downlink grant;
    when the mobile device has uplink data traffic that can be scheduled using an uplink grant, receiving an uplink grant at a mobile device with a CSI trigger; and
    transmitting the CSI feedback by the mobile device in response to the CSI trigger in the uplink grant.

2. The method of claim 1, further including:
    selecting, at the mobile device, a set of transmission resources from a plurality of sets of transmission resources configured by higher layers.

3. The method of claim 2, wherein the selecting includes one or more of: identifying a radio resource control (RRC) signal designating the set of transmission resources for selection;
    identifying a downlink control information (DCI) format associated with the set of transmission resources for selection;
    identifying a control channel type associated with the set of transmission resources for selection;
    identifying a decoding candidate from a plurality of decoding candidates, wherein the identified decoding candidate is associated with the set of transmission resources for selection; and
    identifying a subframe for transmission of the CSI feedback, wherein the identified subframe is associated with the set of transmission resources for selection.

4. The method of claim 2, wherein each of the plurality of sets of transmission resources includes one or more of:
    transmission resource identification information;
    CSI feedback type; uplink channel type;
    transport power control (TPC) command for an uplink channel identified for CSI feedback transmission;
    a cyclic shift for demodulation reference signal (DM-RS) and orthogonal cover code (OCC) index; and
    a request for an aperiodic sounding reference signal (SRS).

5. The method of claim 4, wherein transmission resource identification information includes one or more of:
    resource location;
    resource bandwidth;
    modulation order;
    rank, and
    precoding index.

6. The method of claim 5, wherein at least one of the modulation order or rank for transmission of CSI feedback is fixed.

7. The method of claim 2, further including:
    identifying a number of times to repeat the transmitting of the CSI feedback in response to the CSI trigger.

8. The method of claim 7, wherein the number is one of:
    a predetermined number; and
    a configured number.

9. The method of claim 7, wherein the CSI feedback transmitted during each of the number of times includes one of:
    a same type of CSI feedback; and
    a different type of CSI feedback.

10. The method of claim 1, further including:
    dropping any periodic CSI in the other uplink signals.

11. The method of claim 1, wherein the detected collision is a collision between uplink data channel, the method further including:
    dropping the uplink data channel including the CSI feedback triggered by the CSI trigger in the downlink grant.

12. The method of claim 1, wherein detecting, by the mobile device, the CSI trigger in the downlink grant includes detecting, by the mobile device, one or more new bits in the downlink grant.

13. The method of claim 12, wherein detecting, by the mobile device, the CSI trigger in the downlink grant further includes reinterpreting, by the mobile device, one or more existing bits in the downlink grant.

14. The method of claim 1, wherein detecting, by the mobile device, the CSI trigger in the downlink grant includes reinterpreting, by the mobile device, one or more existing bits in the downlink grant.

15. An apparatus configured for wireless communication, comprising:
    means for when the mobile device does not have uplink data traffic that can be scheduled using an uplink grant, receiving a downlink grant at a mobile device with a channel state information (CSI) trigger;
    means for detecting, by the mobile device, the CSI trigger in the downlink grant;
    means for detecting a collision of CSI feedback triggered by the CSI trigger in the downlink grant with other uplink signals scheduled for the mobile device:
    means for, in response to the collision, multiplexing the CSI feedback with the other uplink signals;
    means for transmitting the CSI feedback by the mobile device in response to the CSI trigger the downlink grant;
    means for when the mobile device has uplink data traffic that can be scheduled using an uplink grant, receiving an uplink grant at a mobile device with a CSI trigger; and
    means for transmitting the CSI feedback by the mobile device in response to the CSI trigger in the uplink grant.

16. The apparatus of claim 15, further including:
means for selecting, at the mobile device, a set of transmission resources from a plurality of sets of transmission resources configured by higher layers.

17. The apparatus of claim 16, wherein the means for selecting includes one or more of:
means for identifying a radio resource control (RRC) signal designating the set of transmission resources for selection;
means for identifying a downlink control information (DCI) format associated with the set of transmission resources for selection;
means for identifying a control channel type associated with the set of transmission resources for selection;
means for identifying a decoding candidate from a plurality of decoding candidates, wherein the identified decoding candidate is associated with the set of transmission resources for selection; and
means for identifying a subframe for transmission of the CSI feedback, wherein the identified subframe is associated with the set of transmission resources for selection.

18. The apparatus of claim 16, wherein each of the plurality of sets of transmission resources includes one or more of:
transmission resource identification information;
CSI feedback type;
uplink channel type;
transport power control (TPC) command for an uplink channel identified for CSI feedback transmission;
a cyclic shift for demodulation reference signal (DM-RS) and orthogonal cover code (OCC) index; and
a request for an aperiodic sounding reference signal (SRS).

19. The apparatus of claim 18, wherein transmission resource identification information includes one or more of:
resource location;
resource bandwidth;
modulation order;
rank, and
precoding index.

20. The apparatus of claim 19, wherein at least one of the modulation order or rank for transmission of CSI feedback is fixed.

21. The apparatus of claim 14, further including:
means for identifying a number of times to repeat the means for transmitting of the CSI feedback in response to the CSI trigger.

22. The apparatus of claim 21, wherein the number is one of:
a predetermined number; and
a configured number.

23. The apparatus of claim 21, wherein the CSI feedback transmitted during each of the number of times includes one of:
a same type of CSI feedback; and
a different type of CSI feedback.

24. The apparatus of claim 15, further including:
means for dropping any periodic CSI in the other uplink signals.

25. The apparatus of claim 15, wherein the detected collision is a collision between uplink data channel, the apparatus further including:
means for dropping the uplink data channel including the CSI feedback triggered by the CSI trigger in the downlink grant.

26. A computer program product comprising:
a non-transitory computer-readable medium having program code recorded thereon, the program code, when executed by a computer, causing the computer to:
when the mobile device does not have uplink data traffic that can be scheduled using an uplink grant, receive a downlink grant at a mobile device with a channel state information (CSI) trigger;
detect, by the mobile device, the CSI trigger in the downlink grant;
detect a collision of CSI feedback triggered by the CSI trigger in the downlink grant with other uplink signals scheduled for the mobile device:
in response to the collision, multiplex the CSI feedback with the other uplink signals;
transmit the CSI feedback by the mobile device in response to the CSI trigger the downlink grant;
when the mobile device has uplink data traffic that can be scheduled using an uplink grant, receiving an uplink grant at a mobile device with a CSI trigger; and
transmitting the CSI feedback by the mobile device in response to the CSI trigger in the uplink grant.

27. The computer program product of claim 26, further including program code causing a computer to:
select, at the mobile device, a set of transmission resources from a plurality of sets of transmission resources configured by higher layers.

28. An apparatus configured for wireless communication, comprising:
at least one processor; and
a memory coupled to said at least one processor,
wherein the at least one processor is configured to:
when the mobile device does not have uplink data traffic that can be scheduled using an uplink grant, receive a downlink grant at a mobile device with a channel state information (CSI) trigger;
detect, by the mobile device, the CSI trigger in the downlink grant;
detect a collision of CSI feedback triggered by the CSI trigger in the downlink grant with other uplink signals scheduled for the mobile device:
in response to the collision, multiplex the CSI feedback with the other uplink signals:
transmit the CSI feedback by the mobile device in response to the CSI trigger the downlink grant;
when the mobile device has uplink data traffic that can be scheduled using an uplink grant, receiving an uplink grant at a mobile device with a CSI trigger; and
transmitting the CSI feedback by the mobile device in response to the CSI trigger in the uplink grant.

29. The apparatus of claim 28, further including configuration of the at least one processor to:
select, at the mobile device, a set of transmission resources from a plurality of sets of transmission resources configured by higher layers.

* * * * *